United States Patent
Czipo et al.

(10) Patent No.: US 11,928,097 B2
(45) Date of Patent: Mar. 12, 2024

(54) DETERMINISTIC SEMANTIC FOR GRAPH PROPERTY UPDATE QUERIES AND ITS EFFICIENT IMPLEMENTATION

(71) Applicant: Oracle International Corporation, Redwood Shores, CA (US)

(72) Inventors: Bence Czipo, Schlieren (CH); Vlad Ioan Haprian, Zurich (CH); Oskar Van Rest, Mountain View, CA (US); Damien Hilloulin, Zurich (CH); Vasileios Trigonakis, Zurich (CH); Yahya Ez-zainabi, Berrechid (MA); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/479,006

(22) Filed: Sep. 20, 2021

(65) Prior Publication Data
US 2023/0095703 A1    Mar. 30, 2023

(51) Int. Cl.
*G06F 16/23* (2019.01)
*G06F 11/07* (2006.01)

(52) U.S. Cl.
CPC ...... *G06F 16/2315* (2019.01); *G06F 11/0772* (2013.01); *G06F 16/2365* (2019.01)

(58) Field of Classification Search
None
See application file for complete search history.

(56) References Cited

U.S. PATENT DOCUMENTS

| | | |
|---|---|---|
| 5,760,773 A | 6/1998 | Berman |
| 2002/0087275 A1 | 7/2002 | Kim |

(Continued)

FOREIGN PATENT DOCUMENTS

WO    WO 2020/019313 A1    1/2020

OTHER PUBLICATIONS

Merrill et al. Scalable GPU Graph Traversal, 2012, 11 pages (Year: 2012).

(Continued)

*Primary Examiner* — Irene Baker
(74) *Attorney, Agent, or Firm* — Hickman Becker Bingham Ledesma LLP; Brian Miller

(57) ABSTRACT

Efficiently implemented herein is a deterministic semantic for property updates by graph queries. Mechanisms of determinism herein ensure data consistency for graph mutation. These mechanisms facilitate optimistic execution of graph access despite a potential data access conflict. This approach may include various combinations of special activities such as detecting potential conflicts during query compile time, applying query transformations to eliminate those conflicts during code generation where possible, and executing updates in an optimistic way that safely fails if determinism cannot be guaranteed. In an embodiment, a computer receives a request to modify a graph. The request to modify the graph is optimistically executed after preparation and according to safety precautions as presented herein. Based on optimistically executing the request, a data access conflict actually occurs and is automatically detected. Based on the data access conflict, optimistically executing the request is prematurely and automatically halted without finishing executing the request.

18 Claims, 5 Drawing Sheets

(56) References Cited

U.S. PATENT DOCUMENTS

| | | | | |
|---|---|---|---|---|
| 2009/0133032 | A1* | 5/2009 | Biles | G06F 9/467 |
| | | | | 718/106 |
| 2011/0029490 | A1* | 2/2011 | Agarwal | G06F 9/467 |
| | | | | 712/228 |
| 2011/0302143 | A1* | 12/2011 | Lomet | G06F 16/2322 |
| | | | | 707/704 |
| 2013/0006935 | A1 | 1/2013 | Grisby | |
| 2013/0222388 | A1 | 8/2013 | McDonald | |
| 2014/0019490 | A1 | 1/2014 | Roy | |
| 2014/0074764 | A1 | 3/2014 | Duftler | |
| 2014/0075121 | A1* | 3/2014 | Blundell | G06F 9/467 |
| | | | | 711/E12.022 |
| 2014/0189665 | A1 | 7/2014 | Hong | |
| 2015/0089153 | A1* | 3/2015 | Busaba | G06F 12/0815 |
| | | | | 711/141 |
| 2016/0071233 | A1 | 3/2016 | Macko et al. | |
| 2016/0140152 | A1* | 5/2016 | Sevenich | G06F 16/2228 |
| | | | | 707/755 |
| 2016/0179876 | A1* | 6/2016 | Jimenez Peris | H04L 67/01 |
| | | | | 707/703 |
| 2016/0217187 | A1* | 7/2016 | Iesiev | G06F 16/248 |
| 2017/0068746 | A1* | 3/2017 | Levin | G06F 16/9024 |
| 2017/0090807 | A1 | 3/2017 | Gupta et al. | |
| 2017/0286122 | A1 | 10/2017 | Wu et al. | |
| 2018/0315228 | A1 | 11/2018 | Boettcher | |
| 2018/0329900 | A1* | 11/2018 | Spiegel | G06N 20/00 |
| 2019/0042661 | A1 | 2/2019 | Sevenich | |
| 2020/0081883 | A1* | 3/2020 | Avni | G06F 16/2308 |
| 2022/0035794 | A1* | 2/2022 | Mahadik | G06F 16/2379 |
| 2022/0067029 | A1* | 3/2022 | Murthy | G06F 16/2379 |

OTHER PUBLICATIONS

Bebee et al., "Amazon Neptune: Graph Data Management in the Cloud", Amazon Web Services, http://ceur-ws.org/Vol-2180/paper-79.pdf, dated 2018, 2 pages.

Bebee et al., "Transactional Guarantees for SPARQL Query Execution with Amazon Neptune", Amazon Web Services, http://ceur-ws.org/Vol-2456/paper90.pdf, dated 2019, 2 pages.

Dave et al., "GraphFrames: An Integrated API for Mixing Graph and Relational Queries", https://cs.stanford.edu/~matei/papers/2016/grades_graphframes.pdf, dated 2016, 8 pages.

Deutsch et al., "TigerGraph: A Native MPP Graph Database", https://arxiv.org/pdf/1901.08248.pdf, dated Jan. 2019, 28 pages.

Flores et al, "Semantic Data Management in Graph Databases", Tutorial at ESWC 2014-, dated 2014, 153 pages.

Freeman, Eve, "Getting Started with Neo4j and Cypher", https://www.airpair.com/neo4j/posts/getting-started-with-neo4j-and-cypher, dated Oct. 2016, 12 pages.

Green et al., "Updating Graph Databases with Cypher", 45th International Conference on Very Large Data Bases (VLDB), vol. 12, No. 12, https://hal.archives-ouvertes.fr/hal-03012016, dated Aug. 2019, 13 pages.

Hong et al., "Green-Marl: A DSL for Easy and Efficient Graph Analysis", ASPLOS'12 Mar. 3-7, 2012, London, England, UK, 14 pages.

Karippai, Naveen, "Learning How References Work in JavaScript", dated Nov. 13, 2016, https://medium.com/@naveenkarippai/learning-how-references-work-in-javascript-a066a4e15600, 7 pages.

Angles et al., "RDF and Property Graphs Interoperability: Status and Issues", http://ceur-ws.org/Vol-2369/paper01.pdf, dated 2019, 11 pages.

Martensen, Dan, "The Anatomy of a JavaScript Function", dated Jan. 16, 2015, https://danmartensen.svbtle.com/the-anatomy-of-a-javascript-function. 9 pages.

Wikipedia.org., "Graph Traversal Steps", http://www.tinkerpop.com/javadocs/3.0.2-incubating/core/org/apache/tinkerpop/gremlin/process/graph/GraphTraversal.html, dated Oct. 2019, 55 pages.

Neo4j.com, "Updating with Cypher", https://neo4j.com/developer/cypher/updating/1/15, dated Jun. 2021, 15 pages.

Oracle, "The Java Tutorials" Autoboxing and Unboxing, Learning the Java Language, Numbers and Strings, https://docs.oracle.com/javase/tutorial/java/data/autoboxing.html, last viewed May 1, 2017, 2pgs.

Patiño-Martínez et al., "Snapshot Isolation for Neo4j", 19th International Conference on Extending Database Technology (EDBT), https://openproceedings.org/2016/conf/edbt/paper-333.pdf, dated Mar. 2016, 2 pages.

Property Graph Query Language, "Graph Modification", PGQL 1.3 Specification, https://pgql-lang.org/spec/1.3/#graph-modification, dated Mar. 24, 2020, 10 pages.

PRQA, "8.1.1 Do Not Use Multiple Levels of Pointer Indirection", dated Jun. 15, 2015.

R igraph manual pages, http://igraph.org/r/doc/igraphattributecombination.html, last viewed on May 1, 2017, 3 pages.

Sparsity Technologies, "Sparksee User Manual", API, http://www.sparsity-technologies.com/UserManual/API.html, 61 pages, dated 2015.

TigerGraph Documentation, "Data Modification Statements", https://docs.tigergraph.com/dev/gsql-ref/querying/data-modification-statements, dated 2018, 15 pages.

Tulip Team, "Tulip Library", dated Feb. 14, 2015.

Verhas, Peter, "Pointers in Java", https://dzone.com/articles/pointers-in-java, dated Jan. 16, 2016, 3 pages.

Lourenco, Alexandre, "Java 8: Knowing the New Features-Streams", dated Jan. 10, 2017.

Sevenich, U.S. Appl. No. 15/666,310, filed Aug. 1, 2017, Office Action, dated May 29, 2019.

Sevenich, U.S. Appl. No. 15/666,310, filed Aug. 1, 2017, Notice of Allowance, dated Oct. 28, 2019.

Haubenschild, U.S. Appl. No. 16/265,090, filed Feb. 1, 2019, Notice of Allowance, dated May 19, 2021.

Boettcher, U.S. Appl. No. 15/581,820, filed Apr. 28, 2017, Office Action, dated Sep. 18, 2018.

Boettcher, U.S. Appl. No. 15/581,820, filed Apr. 28, 2017, Office Action, dated Aug. 8, 2019.

Boettcher, U.S. Appl. No. 15/581,820, filed Apr. 28, 2017, Notice of Allowance, dated Apr. 30, 2020.

Boettcher, U.S. Appl. No. 15/581,820, filed Apr. 28, 2017, Notice of Allowance, dated Jan. 29, 2020.

Boettcher, U.S. Appl. No. 15/581,820, filed Apr. 28, 2017, Interview Summary, dated Dec. 19, 2018.

Boettcher, U.S. Appl. No. 15/581,820, filed Apr. 28, 2017, Interview Summary, dated May 6, 2019.

Boettcher, U.S. Appl. No. 15/581,820, filed Apr. 28, 2017, Final Office Action, dated Nov. 29, 2019.

Boettcher, U.S. Appl. No. 15/581,820, filed Apr. 28, 2017, Final Office Action, dated Apr. 2, 2019.

Boettcher, U.S. Appl. No. 15/581,820, filed Apr. 28, 2017, Advisory Action, dated Jun. 6, 2019.

* cited by examiner

DETERMINISTIC SEMANTIC FOR GRAPH PROPERTY UPDATE QUERIES AND ITS EFFICIENT IMPLEMENTATION

FIELD OF THE INVENTION

The present invention relates to data consistency for graph mutation. Herein is optimistic execution despite a potential data access conflict.

BACKGROUND

A logical graph such as a property graph is an important data model that captures relationships between data entities. Many software applications in various domains use a graph model for data analysis and querying. As an example, financial compliance applications rely on graph models for investigating risks of wire transfers. For example, an analytic client may ask how a destination account is connected to known fraud accounts, if any. Finding top-k shortest graph traversal paths is a fundamental graph operation for such applications.

When a graph is read only such as for data mining, reporting, and online analytic processing (OLAP), then consistency of the data of the graph is not a problem. However a mutable graph, such as when online transaction processing (OLTP) is included in the workload mix applied to the graph, may experience data access conflicts that pose technical difficulties. For example, updating existing properties in property graphs using a graph query language may cause data access conflicts that, by mechanisms such as a race condition or other mechanisms discussed later herein, may cause graph data to appear temporarily or permanently inconsistent.

Property updates for graphs are somewhat similar to updates of row-column intersections in tables in relational systems. However, in relational systems, a typical approach is to update one table at a time, and within that table, at most one update is applied for each row-column intersection, which is not how a graph database operates. Graph systems have a more powerful update mechanism based on pattern matching such that single updates may affect a variable-sized set of (vertex and edge) tables. However, this additional expressive power of updating based on pattern matching does have technical risks. For example, a vertex or edge variable in a query can map to the same row in the underlying vertex/edge table multiple times. Likewise, two different variables in a query may map to the same row. Updating such variables often leads to write conflicts for the underlying rows, which is a problem that is uncommon for relational databases where typically only a single table (or a fixed set of tables) is updated at once.

Write conflicts that arise during graph mutation can be classified into two groups, read-write (a.k.a. read after write) conflicts and write-write (a.k.a. write after write) conflicts. Read-write conflicts can occur if a property of a vertex/edge is both written and read in the same query. For example, a query may contain two variables u-v, and a same vertex may match both variables u-v, in which case the value of a property (e.g. color) of the vertex is both read and written, so the final result can depend on which order the property accesses are executed. Write-write conflicts can occur if the same property of the same vertex is written multiple times. In this case, depending on the order of writes, the value is nondeterministic, such as when the vertex matches both variables u-v.

As discussed above, relational database systems are not exposed to the same data access conflicts because only one table is updated at a time, and data in that table is updated at most once. However, structured query language (SQL) systems can also face issues of a somewhat similar nature when update values come from subqueries. In those cases however, according to SQL standards, the updates can only be executed (i.e. not rejected as erroneous) if a scalar subquery has at most one result (row-column intersection), which can be very limiting.

DETAILED DESCRIPTION

Figure 1:
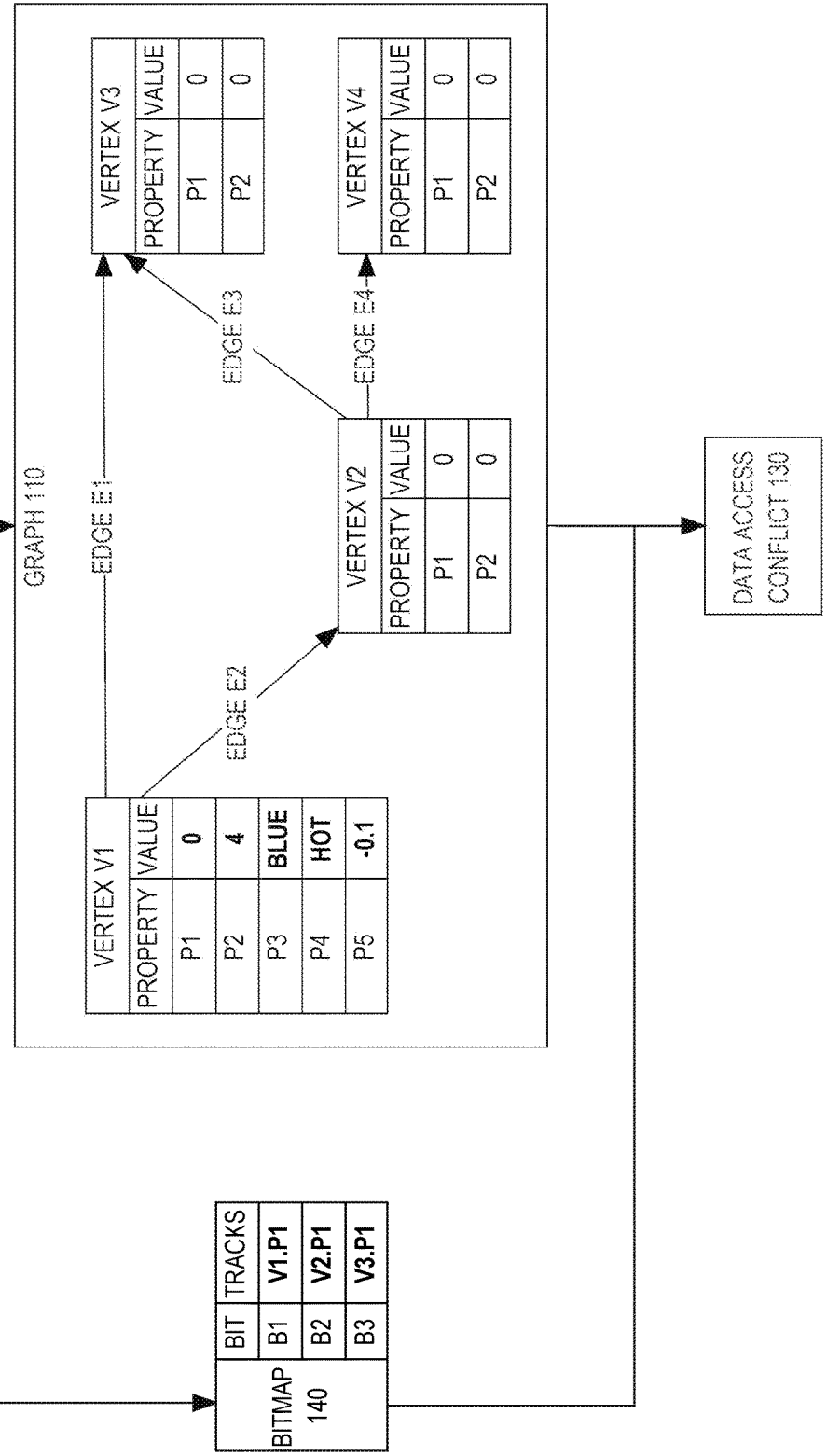
FIG. 1 is a block diagram that depicts an example computer that provides safe and optimistic execution of a modification request for a graph despite potential data access conflict(s)

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

GENERAL OVERVIEW

Efficiently implemented herein is a deterministic semantic for property updates by graph queries. Mechanisms of determinism herein ensure data consistency for graph mutation. These mechanisms facilitate optimistic execution of graph access despite a potential data access conflict. This approach may include various combinations of special activities such as detecting potential conflicts during query compile time, applying query transformations to eliminate those conflicts during code generation where possible, and executing updates in an optimistic way that safely fails if determinism cannot be guaranteed.

This approach can resolve all read-write conflicts and detect potential write-write conflicts during compile time and then execute the updates in a consistent manner whenever possible. Operationally, this is in contrast to other pessimistic approaches that will not attempt execution if a data access conflict is possible. Thus, this approach can safely execute graph manipulation commands that other approaches will not execute. Furthermore, techniques herein are highly efficient in time and space.

In an embodiment, a graph analytic engine safely, and sometimes optimistically, executes updates on tuples of vertices and/or edges, where each tuple may be a result of a graph pattern matching expression. For example, a graph manipulation command may specify traversing vertices and edges according to filtration criteria for pattern matching, and along or at the end of those traversal paths may be reached vertices and edges to update. An especially problematic example is a single command that matches multiple partially overlapping paths that share some vertices and edges that are both traversed and updated while traversing a same or different paths.

The execution of the graph property update operation consists of three steps that, in an embodiment, may occur in the following sequence in response to receiving a manipulation command.

1. Plan generation: analyzing the input command and generating the query plan.
2. Code generation: analyzing the query plan and selecting the most suitable executable operators for the query plan. According to the details of the command and the semantics of the manipulation language, operators can be variously arranged to cooperate in serial or in parallel.
3. Safely executing the cooperating operators on the graph and returning results.

In an embodiment, static and runtime analysis of the graph data are combined as respective sequential phases. During the query planning time, this approach analyzes the command for potential read-write and write-write conflicts. Findings of the analysis are considered during code generation for managing potential read-write conflicts, such as by materializing copies (i.e. snapshots) of data, and for managing potential write-write conflicts, such as by runtime conflict checking. Thus, different logic can be dynamically generated for the command based on what conflicts are detected as possible and which safety mechanisms are suitable. During command execution in an embodiment, suspected write-write conflicts are checked for actual occurrence, and if a property of a vertex is written more than once, the update fails and is safely reverted.

In an embodiment, write after write conflicts are prevented as follows. To avoid overwriting a same property of a same graph element (i.e. vertex or edge) multiple times, property value assignments are analyzed, and if they are recognized as unsafe by a static analyzer (e.g. immediately) before execution, then during execution time, a respective flag is operated to track each of the involved (i.e. per matching criteria of the command) graph elements that share a same property being updated. For such tracking, using a bitmap is highly time and space efficient. This algorithm consists of two sequential steps: marking and updating. During the marking phase in an embodiment, all matched graph elements are iterated, and if their property would be written, a corresponding Boolean value becomes set to true, unless it is already true, in which case a potential data access conflict has become an actually occurring conflict, and execution of the command prematurely and safely halts without finishing. Otherwise, the potential write after write conflict does not actually occur and, in the second step, the updates of the graph elements are safely executed.

In an embodiment, read after write conflicts are prevented as follows. To avoid read after write conflicts, the algorithm materializes the right hand side operands of update assignments to temporary variables before the property assignment happens. This ensures consistency and, according to techniques herein, read-write conflicts can always (or when cost justified) be eliminated by materialization.

In an embodiment that operates results of the graph pattern matching as a sequence of tuples, materialization may impose an additional iteration over partial results of the graph matching, and thus might be too expensive to justify. For this reason in an embodiment, only those assignments are materialized that, during static analysis of the command, are detected as potentially conflicting.

In an embodiment, a computer receives a request to modify a graph. The request to modify the graph is optimistically executed after preparation and according to safety precautions as presented herein. Based on optimistically executing the request, a data access conflict actually occurs and is automatically detected. Based on the data access conflict, optimistically executing the request is prematurely and automatically halted without finishing executing the request.

1.0 Example Graph Analysis Computer

FIG. 1 illustrates example computer 100 that provides safe and optimistic execution of modification request 120 for graph 110 despite potential data access conflict 130. Computer 100 may be one or more of a rack server such as a blade, a mainframe, a personal computer, a virtual computer, or other computing device.

Computer 100 contains and/or accesses volatile and/or nonvolatile storage that contains logical graph 110 such as in data structure(s) such as one or two dimensional arrays, database tables, and/or a heap. Graph 110 contains many graph elements that are vertices V1-V4 and edges E1-E4. Each edge connects two vertices as shown or, as a self-directed edge (not shown), connects one vertex to itself.

1.1 Graph Elements

Each edge may be an undirected edge (not shown) that does not impose roles on its connected vertices or may be a directed edge as shown that originates at a source vertex and terminates at a destination vertex. For example, edge E1 originates at vertex V1 and terminates at vertex V3. Graph 110 is a directed graph (digraph) because it contains directed edges E1-E4. An undirected graph contains no directed edges. Although not shown, multiple edges may connect a same two vertices in a same or different directions.

A vertex may originate zero or more edges. For example, vertex V1 originates edges E1-E2, and vertex V3 originates no edges. A vertex may terminate zero or more edges. For example, vertex V3 terminates edges E1 and E3, and vertex V1 terminates no edges. A vertex may be only a source vertex (e.g. vertex V1), only a destination vertex (e.g. vertex V3), or both a source and a destination (e.g. vertex V2).

In this example, graph 110 is a property graph. A vertex or edge may have zero or more properties. For example, vertex V1 has properties P1-P5. Herein, dot notation may specify property access. For example, V1.P3 is an expression that evaluates to blue, which may mean that V1 is a blue vertex.

Different vertices or different edges may have different respective values of a same property. For example, the V1.P2 is four, but V2.P2 is instead zero. Different vertices may have different respective sets of properties. For example, vertex V1 has property P3 but vertex V2 does not.

1.2 Modification Request

Graph 110 is mutable such that property values may change, such as during online transaction processing (OLTP). For example, modification request 120 may be a data manipulation language (DML) statement that may change the value of one or more properties in one or more vertices or one or more edges. The same DML statement may also read property value(s) such as for filtration or for computing new values for a same or different property of a same or different graph element (i.e. vertex or edge).

Thus, modification request 120 may be somewhat ambiguous as to which ordering do reads and/or writes of a same property of a same graph element occur. This ambiguity may be especially complicated by multiple variables that are specified within modification request 120 that both reads and writes same variable(s). Thus, a logical violation of data consistency may occur, shown as data access conflict 130.

1.3 Data Access Conflicts

For example, data access conflict 130 may manifest as various consistency problems such as unrepeatable behavior or logically impossible value combinations. For example, data access conflict 130 may occur when a read in one assignment reads values from another assignment in the same update. Data access conflict 130 may occur even when only one property is involved. For example, the following DML statement has two variables u-v but only one property P1.

UPDATE v SET(v.P1=f(u))FROM MATCH(v)→(u)

In the query above, property P1 of every vertex matched by variable v is updated, and same property P1 of every vertex that is matched by variable u is read in the invocation of fO. If same vertex V1 is matched by both (v) and (u), then the value of V1.P1 is both read and written, so the final result can depend on which order the reads and writes occur, which may be nondeterministic (e.g. not consistently repeatable). In this case, data access conflict 130 is a read after write conflict. Various mechanisms may cause nondeterminism such as parallelism (e.g. race condition), caching, and hashing.

In some cases such as with a GROUP BY clause in the following DML statement that superficially appears as though the assignment could potentially be write after write conflicting, the semantics of group by and the aggregation function implicitly ensures there will be no write after write conflict.

UPDATE v SET(v.P1=SUM(u.P1))FROM MATCH (v)→(u)GROUP BY u

Data access conflict 130 may instead be a write after write conflict such as with the following DML statement.
UPDATE
v
SET
(
v.P
1=
4
), u
SET
(
u.P
1=
5)
FROM MATCH (v)→(u)

If the above DML, statement matches vertex V1 to both variables u-v, then V1.P1 may non-deterministically and finally become either four or five.

1.4 Optimistic Execution

Computer 100 may be configured to analyze modification request 120 to detect, before executing modification request 120, whether or not modification request 120 certainly or possibly would cause data access conflict 130 when executed. Other approaches are pessimistic such that if modification request 120 could possibly cause data access conflict 130, then modification request 120 is unconditionally rejected without being executed. Unlike other approaches, computer 100 optimistically attempts to execute modification request 120, which fails only if computer 100 detects that data access conflict 130 actually occurs.

Thus in many cases, computer 100 successfully executes modification request 120 that other approaches would pessimistically have not even attempted. In that way, the functional performance of computer 100 is extended beyond what other graph manipulation approaches are capable of. In other words, other graph analysis computers operationally provide significantly less than computer 100.

1.5 Tracking Metadata

Optimistic execution of modification request 120 may be safely attempted as facilitated by bitmap 140 that stores metadata that tracks the modification status of a particular property of those graph elements for which data access conflict 130 may occur. For example as shown in the tracks column, bitmap 140 tracks property P1 for vertices. By analysis of modification request 120, computer 100 may detect which graph elements might or cannot experience data access conflict 130 for a particular property. For example if modification request 120 specifies filtration that excludes blue vertices, then computer 100 may detect that modification request 120 cannot cause data access conflict 130 with vertex V1. Such graph elements that are detected as safe need not be tracked in bitmap 140.

In an embodiment, a variable represents either exclusively vertex(s) or exclusively edge(s), but not both. When two variables are used in a same DML statement to respectively update a same property of same or different vertices, there is only one bitmap for that vertex property. When a vertex variable and an edge variable are used in a same DML statement to respectively update a same property that is shared by vertices and edges, there are two bitmaps for that property, respectively for vertices and edges.

Bitmap 140 contains bits B1-B3 that respectively correspond to vertices V1-V3 that can possibly experience data access conflict 130 for property P1. In this example, bitmap 140 does not track vertex V4 that cannot experience data access conflict 130. For example, modification request 120 may match various multi-vertex traversal paths in graph 110 that exclude edge E4. For example, edge E4 may have a property value (not shown) that is excluded by modification request 120. Thus, the size of bitmap 140 may dynamically depend on the details of modification request 120, the topology of graph 110, and/or the property values of elements of graph 110.

For example for same graph 110, a different modification request may need a bitmap that has a different count of bits or whose bits represent different vertices than bitmap 140. Likewise, same modification request 120 may need a bitmap that has a different count of bits or whose bits represent different vertices than bitmap 140 when modification request 120 is executed with a different graph or executed again after graph 110 is modified. For example, if modification request 120 is not idempotent, then repeated executions of modification request 120 with same graph 110 may or may not need bitmaps of different sizes.

1.6 Bitmap Configuration and Operation

In an embodiment, computer 100 detects how many graph elements might experience data access conflict 130 and generates bitmap 140 with that many bits before optimistically executing modification request 120. In an embodiment, a bit is allocated in bitmap 140 for a particular graph element if, for a same property of the graph element, modification request 120 specifies accessing the property in a way that can cause writing the property once and then reading or again writing the same property of the same graph element such as by a same or different variable. For example, a property specified in the left hand side (LHS) of a property assignment expression may be detected as a write, and a property specified in the right hand side (RHS) of a property assignment expression may be detected as a read. Likewise, a property specified in a filter expression or a projection expression may be detected as a read.

Initially, all of bits B1-B3 are clear (i.e. zero) to indicate that a particular property is unchanged for the respective vertices. When that property of a vertex is read or written during optimistic execution, the corresponding bit in bitmap 140 is checked. If the bit is already set (i.e. one), then data access conflict 130 is detected and modification request 120 is prematurely halted such as by throwing an exception, returning an error code, and/or rolling back a transaction that may or may not be atomic, consistent, isolated, and durable (ACID).

If the bit is detected as already set for a read of the property, then a read after write conflict is detected, although later herein is a different approach that prevents read after write conflicts. If the bit is detected as already set for a write of the property, then a write after write conflict is detected. If the bit is detected as not yet set for a read or write, then that read or write does not cause data access conflict 130. If the bit is detected as not yet set for a write, then the bit becomes set. If the bit is detected as not yet set for, in some embodiments, a read, then the bit remains unset. For example, modification request 120 may cause in the following sequence: a) multiple reads (in some embodiments) of V1.P1 that detect that bit B1 is clear, b) a first write of V1.P1 that detects that bit B1 is clear and then sets bit B1, and c) a write or, in some embodiments, a read that detects that bit B1 is already set, which causes modification request 120 to abort.

1.7 Bitmap Scope

Each property may have its own respective bitmap for tracking changes. For example, bitmap 140 is for property P1 as shown, and there may be another bitmap for property P2 that may track the same or different vertices. For each write that modification request 120 performs on a tracked property of a tracked graph element, a respective bit in a respective bitmap should be checked and set. Optimistic execution of modification request 120 succeeds only if all checks of respective bitmaps for all performed writes do not detect an already set bit.

Regardless of whether modification request 120 succeeds or fails, it can be resubmitted for repeated execution, in which case bitmap 140 is replaced or all of its bits are cleared. In other words, each optimistic execution always begins with a bitmap consisting only of clear bits. As explained above, the size of bitmap 140 may be different in different executions of same modification request 120. Likewise, multiple (e.g. repeated) optimistic executions of same modification request 120 may need different counts of bitmaps.

For example based on filtration, two properties P1-P2 may be detected as potentially experiencing a data access conflict for a first execution of modification request 120, and thus two bitmaps are needed. Whereas after graph 110 is modified such as by the first execution, only property P1 may be detected as potentially experiencing a data access conflict for a second execution of same modification request 120. Thus, the first execution needs two bitmaps for two properties P1-P2 but the second execution needs only one bitmap for one property P1. Thus, automatic decisions as to which bitmaps and their sizes for conflict detection should be dynamic. For example for same modification request 120, one execution may need bitmaps for edge properties but not vertex properties and vice versa for another execution of same modification request 120.

2.0 Example Process for Safe and Optimistic Execution

Figure 2:
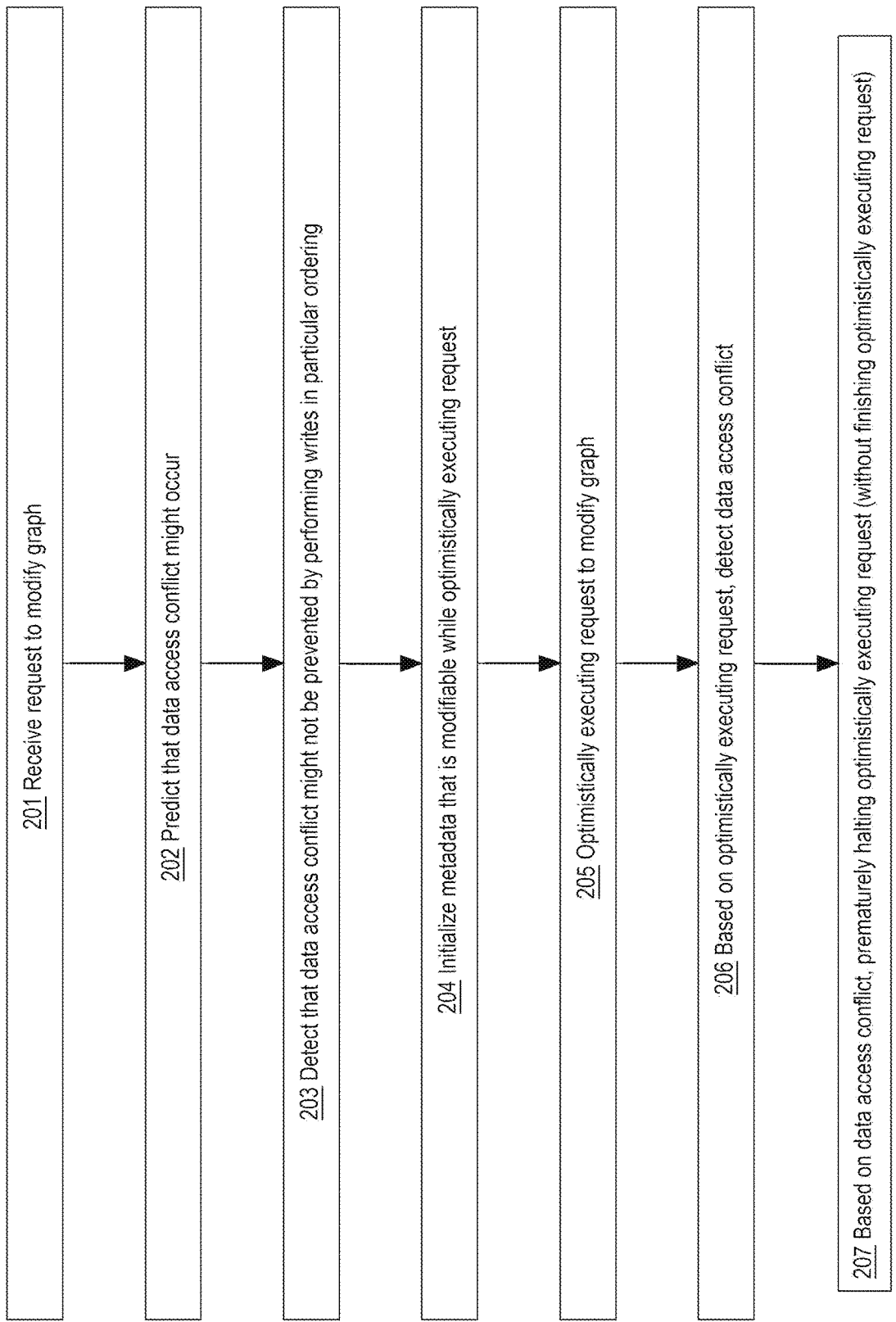
FIG. 2 is a flow diagram that depicts an example computer process that safely and optimistically executes a modification request for a graph despite potential data access conflict(s)

FIG. 2 is a flow diagram that depicts an example process that computer 100 may perform to safely and optimistically execute modification request 120 for graph 110 despite potential data access conflict 130. FIG. 2 is discussed with reference to FIG. 1. Steps 201-207 of FIG. 2 are presented as examples. Various embodiments variously may or may not implement some of steps 201-207.

In an embodiment, the process of FIG. 2 is caused by step 201 that receives modification request 120 to modify graph 110. For example, modification request 120 may be received from a remote client over a communication network, from a collocated local client by inter-process communication (IPC), or from within the same software program as the process of FIG. 2. For example, a graph database may be embedded within a client application such that a database system and the client application share an address space.

Step 201 may receive modification request 120 expressed in a data manipulation language (DML) that might be Turing complete. For example, modification request 120 may occur more or less independently as graph update statement in a graph database session or may occur in a complex script whose processing of graph 110 entails much more than modification request 120.

Steps 202-204 are preparatory and occur before optimistically executing modification request 120. Step 202 predicts (i.e. prospectively detects) that modification request 120 might (i.e. is capable of) cause data access conflict 130. Step 202 may or may not be repeated for multiple properties that are written. For example, modification request 120 may specify writing one vertex property and two different edge properties. For each of those three written properties, detecting a possible conflict is a separate prediction by step 202. Depending on the details of modification request 120, step 202 may predict that zero, one, two, or all three of those three written properties might cause a data access conflict.

Steps 203-204 are responsive to potential data access conflict(s) predicted by step 202. In other words, steps 203-204 are based on the prediction(s) of step 202. As with step 202 as explained above, steps 203-204 may or may not be repeated for multiple properties that are written. For example when step 202 predicts that only two of three written properties might individually experience conflicts, then steps 203-204 occur only for two of the three written properties.

Step 203 detects that data access conflict might not be prevented by performing writes in a particular ordering. For example, modification request 120 may include relaxed semantics that partially or entirely underspecify the ordering of writes such that modification request 120 may somewhat ambiguously (e.g. non-deterministically) execute writes in various different orderings that all formally comply with modification request 120. If step 203 detects that a particular ordering of writes prevents conflict for a particular property, then subsequent step 204 may be skipped for that property. In other words, step 204 occurs only for those properties for which safe access cannot be guaranteed even if a particular ordering of writes were imposed. Other approaches do not attempt to impose a safe ordering of writes of a property and instead would reject modification request 120 that techniques herein can successfully execute.

In particular, step 204 initializes metadata (e.g. bitmap 140) that is modifiable when modification request 120 optimistically executes. For example, step 204 generates one or more bitmaps of same or different sizes for one or more respective properties that might experience conflicts.

Step 205 optimistically executes modification request 120 to modify graph 110. During step 205, bitmap 140 and/or other bitmaps are operated as discussed earlier herein to track writes to particular properties of particular graph elements. Also during step 205 and as discussed earlier herein, particular bits of the bitmap(s) are checked to detect data access conflict 130 that may be a write after write conflict or a read after write conflict, although later herein is a different approach that prevents read after write conflicts. If optimistic execution finishes without occurrence and detection of data access conflict 130, then modification request 120 is successful even though other approaches may instead pessimistically reject modification request 120 without attempting execution.

However in this example, data access conflict 130 actually occurs, and modification request 120 fails. Thus, based on optimistically executing modification request 120, step 206 detects data access conflict 130 by detecting that a read or a write occurs for a same property of a same graph element that was already written by the current execution of modification request 120. For example while processing a read or write of V1.P1, step 206 may detect that bit B1 was already set for a previous write to V1.P1 in the current execution of modification request 120.

Based on data access conflict 130, step 207 prematurely halts (i.e. without completing) optimistically executing modification request 120. As discussed earlier herein, step 207 may throw an exception, return an error code, and/or rollback a transaction. If changes by modification request 120 are buffered instead of directly applied to graph 110, then step 207 discards the buffered changes without applying them to graph 110.

3.0 Example Data Access Conflict Management Activities

Figure 3:
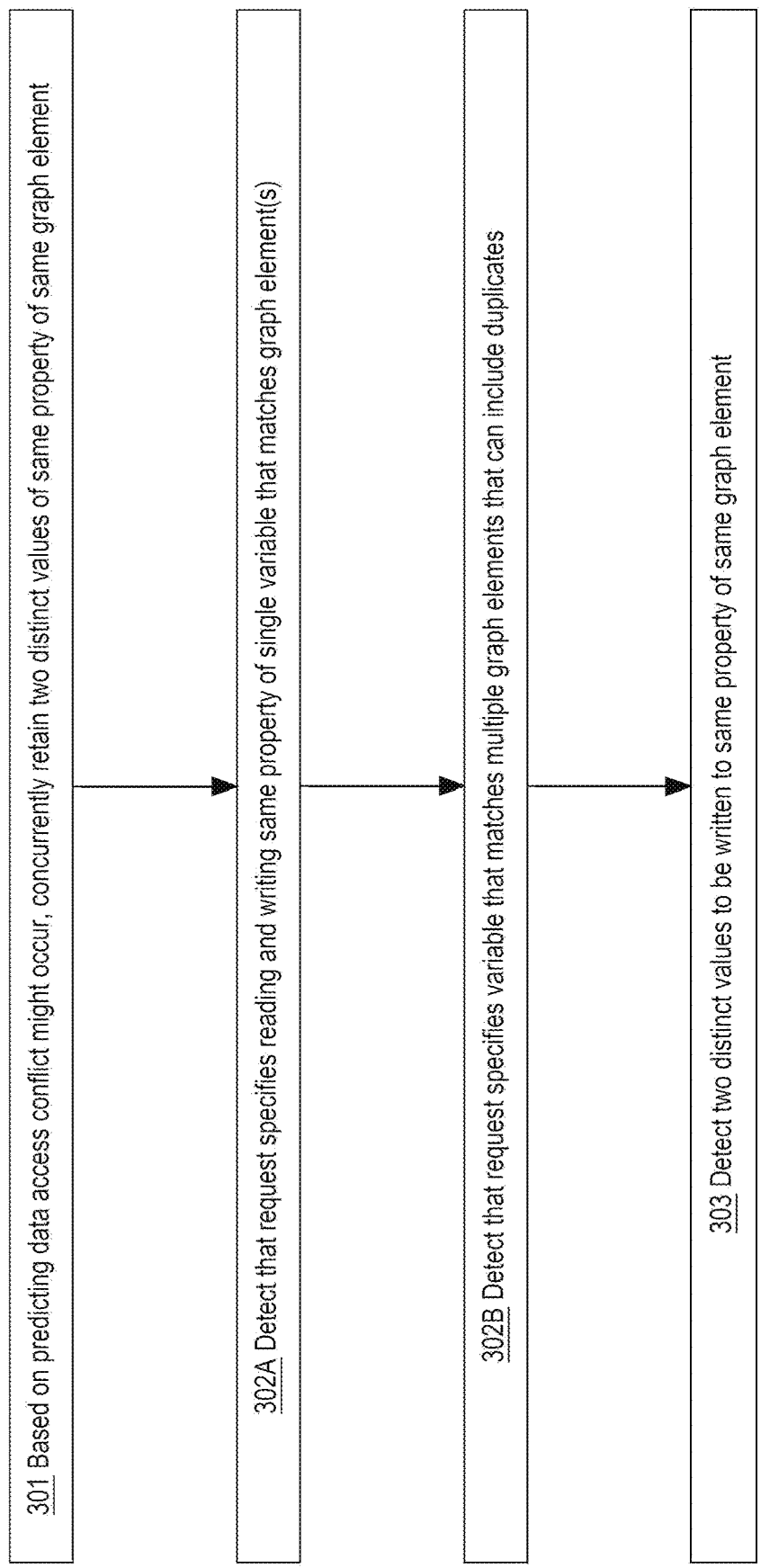
FIG. 3 is a flow diagram that depicts example computer activities to prevent or detect a data access conflict.

FIG. 3 is a flow diagram that depicts example activities that computer 100 may perform to prevent or detect a data access conflict. FIG. 3 is discussed with reference to FIG. 1. The steps of FIG. 3 are presented as examples. Various embodiments variously may or may not implement some of the steps. For example, the steps may respectively occur in different respective scenarios for different respective modification requests, or some or all of the steps may occur for a same modification request.

Steps 301 and 302A-B statically analyze modification request 120 before executing modification request 120. Reacting to modification request 120 may entail two phases in sequence that are static analysis and (e.g. optimistic) execution. Static analysis has various goals including: a) detecting which properties of which graph elements might experience a data access conflict and thus are unsafe and b) detecting whether an unsafe property can be made safe by, as explained below: i) preventing conflict through additional processing and mechanisms or ii) dynamically detecting whether or not a conflict actually occurs during optimistic execution.

In response to predicting that a read after write data access conflict might occur for a property, step 301 concurrently retains two (e.g. distinct) values of that property of a same graph element. One of the two values is a value of the property before the property is updated, and the other value is a value of the property after the property is updated. For example if the property is written in ten edges, then ten before values and ten after values may be concurrently retained. Retaining the before values after the updates is referred to herein as materialization.

All reads of the property for those ten edges read the before values. All writes of the property for those ten edges write the after values. Thus, the before values never change after initialization (i.e. materialization). Thus, the before values may be read only.

Because predicting read after write conflicts is a separate prediction for each property, materialization may occur on a per-property basis. In other words, some properties are materialized and other properties are not, which is an important distinction and optimization as compared to conventional transaction demarcation approaches that do not distinguish between different properties. Likewise, conventional transaction demarcation approaches are not based on static analysis, nor based on the separate expressions and clauses in modification request 120 as a DML statement, nor based on the (e.g. assignment) operators specified within modification request 120.

Materialization prevents read after write conflicts. For example if static analysis reveals that modification request 120 has potential read after write conflicts but no potential write after write conflicts, then materialization and optimistic execution are substitutes of each other. Thus, a property with only a potential read after write conflict may be safely accessed if the property is either: a) materialized before non-optimistic execution or b) during optimistic execution, tracked with mutation metadata such as bitmap 140 as discussed earlier herein.

In an embodiment, processing two properties that have potential read after write conflicts entails materializing one of those properties and using bitmap 140 for the other property. For example, materialization may be expensive in time and space, which might be wasteful if the property has large values such as text strings and/or the involved graph elements are too many. In an embodiment, the before values are compressed by run length encoding (RLE) such that adjacent duplicate values consume almost no space.

As discussed earlier herein, modification request 120 may contain zero or more variables that match graph elements. Depending on the scenario, a single data access conflict 130 may involve zero, one, or more variables. Herein, a self update occurs when a property assignment uses a same graph element on both of the left and right sides of the assignment, such as with variable myVar, such as myVar.P1=myVar.P1+1. If the set of graph elements that myVar matches has no duplicates, then that assignment cannot cause a read after write conflict and thus no materialization or optimistic execution is needed for self update. However, some DML statements involve sets of graph elements that contain duplicates, in which case self update has a potential read after write conflict. For example, the following path query has duplicates edges and, although not shown, modification request 120 may have similar DML that also self updates e.P1. By specifying "COUNT(DISTINCT e)< > COUNT(e)", the path query expects duplicate edges.

SELECT COUNT(e) AS hops
  , SUM(e.P1) AS total_P1
  , ARRAY_AGG(e.P1) AS path_P1
  FROM MATCH TOP 4 SHORTEST (a) -[e]→* (b)
  WHERE a=b AND COUNT (DISTINCT e)< > COUNT
    (e)
ORDER BY hops, total_P1

In particular, steps 302A-B cooperate to predict whether or not a self update is safe or unsafe (i.e. potential conflict) as follows. Step 302A detects that modification request 120 specifies reading and writing same property P1 through a single variable e that matches graph element(s) such as edges E1-E4. As explained earlier herein, modification request 120 may contain variable(s) that match zero, one, some, or all vertices or edges.

Step 302B detects that the self update variable of modification request 120 can match graph elements that can include duplicates, such as edge variable e in the above path query. When both of steps 302A-B affirmatively make respective detections described above, the self update is safe and cannot cause a read after write conflict. In that case, property P1 for edges need not be protected by materialization nor bitmap 140 (i.e. optimistic execution).

Unlike the other steps of FIG. 3, which entail static analysis, step 303 occurs during optimistic execution for a property that was predicted (e.g. during static analysis) to have a potential write after write conflict. Step 303 entails using bitmap 140 that, as discussed earlier herein, can be inspected to detect a second write to a same property of a same graph element. Step 303 is a refinement that, after using bitmap 140 to detect the second write: a) detects whether the second write coincidentally repeats the same value as a first write and b) tolerates or skips the second write without aborting the optimistic execution.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
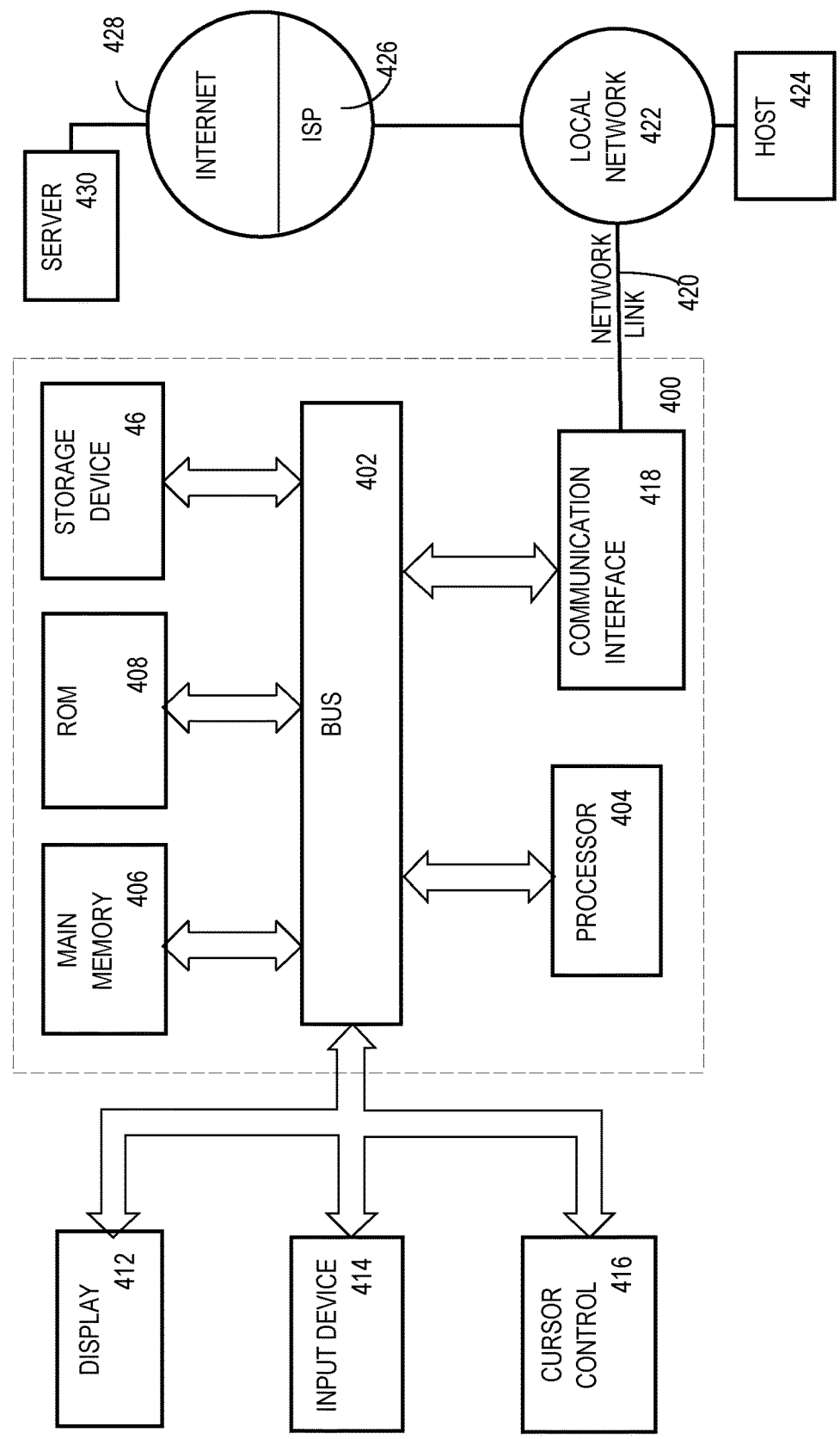
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
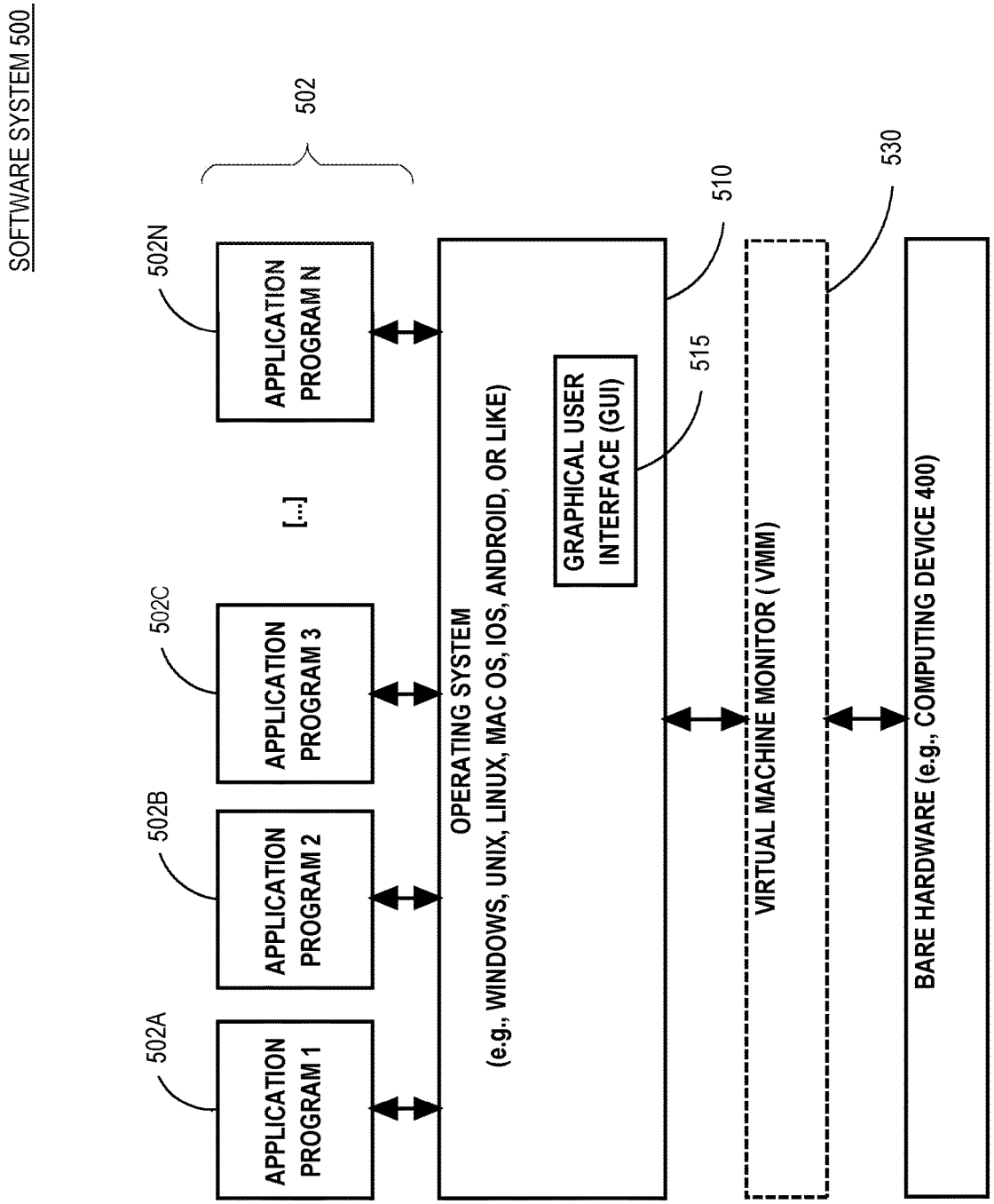
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

What is claimed is:

1. A method comprising:
   receiving a request to modify a graph, wherein the request to modify the graph specifies a path traversal pattern;
   sizing, based on the graph, a modification tracking bitmap for a particular property of vertices or edges in the graph;
   executing the request to modify the graph, including:
   a) processing a plurality of traversal paths in the graph that match the path traversal pattern, wherein the plurality of traversal paths contains a first traversal path and a second traversal path that is longer than the first traversal path, and
   b) updating the modification tracking bitmap to indicate vertices or edges in the plurality of traversal paths having the particular property modified by the request to modify the graph;
   detecting, based on said modification tracking bitmap, a data access conflict on said particular property of vertices or edges in the graph; and
   prematurely halting, based on the data access conflict, said executing the request without finishing said executing the request;

wherein the method is executed by a computer.

2. The method of claim 1 wherein:
   the method further comprises predicting that the data access conflict might occur;
   said sizing the modification tracking bitmap is in response to said predicting that the data access conflict might occur.

3. The method of claim 2 further comprising before said executing the request and based on said predicting that the data access conflict might occur,
   detecting that the data access conflict will not be prevented by performing a plurality of writes in a particular ordering.

4. The method of claim 2 further comprising based on said predicting that the data access conflict might occur, concurrently retaining two distinct values of a same property of a same graph element.

5. The method of claim 2 not comprising based on said predicting that the data access conflict might occur, concurrently retaining two distinct values of a same property of a same graph element.

6. The method of claim 2 wherein said predicting that the data access conflict might occur comprises analyzing filtration specified in the request.

7. The method of claim 1 wherein:
   a particular step comprises accessing, in the modification tracking bitmap, a particular bit that corresponds to a particular element of the graph;
   the particular step is at least one selected from the group consisting of:
     said detecting the data access conflict, and
     said executing the request.

8. The method of claim 7 wherein said detecting the data access conflict comprises detecting two distinct values to be written to a same property of a same graph element.

9. The method of claim 1 wherein said detecting the data access conflict comprises based on said executing the request, detecting at least one selected from the group consisting of: a write after write conflict and a read after write conflict.

10. The method of claim 1 further comprising detecting that the request specifies at least one selected from the group consisting of:
    a variable that matches a plurality of graph elements that contains duplicate graph elements, and
    reading and writing a same property of a single variable that matches a plurality of graph elements.

11. One or more computer-readable non-transitory media storing instructions that, when executed by one or more processors, cause:
    receiving a request to modify a graph, wherein the request to modify the graph specifies a path traversal pattern;
    sizing, based on the graph, a modification tracking bitmap for a particular property of vertices or edges in the graph;
    executing the request to modify the graph, including:
    a) processing a plurality of traversal paths in the graph that match the path traversal pattern, wherein the plurality of traversal paths contains a first traversal path and a second traversal path that is longer than the first traversal path, and
    b) updating the modification tracking bitmap to indicate vertices or edges in the plurality of traversal paths having the particular property modified by the request to modify the graph;

detecting, based on said modification tracking bitmap, a data access conflict on said particular property of vertices or edges in the graph; and prematurely halting, based on the data access conflict, said executing the request without finishing said executing the request.

12. The one or more computer-readable non-transitory media of claim 11 wherein:

the instructions further cause predicting that the data access conflict might occur, said sizing the modification tracking bitmap is in response to said predicting that the data access conflict might occur.

13. The one or more computer-readable non-transitory media of claim 12 wherein the instructions further cause before said executing the request and based on said predicting that the data access conflict might occur, detecting that the data access conflict will not be prevented by performing a plurality of writes in a particular ordering.

14. The one or more computer-readable non-transitory media of claim 12 wherein the instructions further cause based on said predicting that the data access conflict might occur, concurrently retaining two distinct values of a same property of a same graph element.

15. The one or more computer-readable non-transitory media of claim 12 not comprising based on said predicting that the data access conflict might occur, concurrently retaining two distinct values of a same property of a same graph element.

16. The one or more computer-readable non-transitory media of claim 12 wherein said predicting that the data access conflict might occur comprises analyzing filtration specified in the request.

17. The one or more computer-readable non-transitory media of claim 11 wherein:

a particular step comprises accessing, in the modification tracking bitmap, a particular bit that corresponds to a particular element of the graph;

the particular step is at least one selected from the group consisting of:

said detecting the data access conflict, and said executing the request.

18. The one or more computer-readable non-transitory media of claim 11 wherein said detecting the data access conflict comprises based on said executing the request, detecting at least one selected from the group consisting of: a write after write conflict and a read after write conflict.

* * * * *

UNITED STATES PATENT AND TRADEMARK OFFICE
CERTIFICATE OF CORRECTION

| | | |
|---|---|---|
| PATENT NO. | : 11,928,097 B2 | Page 1 of 1 |
| APPLICATION NO. | : 17/479006 | |
| DATED | : March 12, 2024 | |
| INVENTOR(S) | : Czipo et al. | |

It is certified that error appears in the above-identified patent and that said Letters Patent is hereby corrected as shown below:

On the Title Page

On page 2, Column 2, under Other Publications, Line 37, delete "Jan." and insert -- Feb. --, therefor.

In the Specification

In Column 5, Line 24, delete "fO." and insert -- f( ). --, therefor.

In the Claims

In Column 17, Line 10, in Claim 12, delete "occur," and insert -- occur; --, therefor.

Signed and Sealed this
Tenth Day of December, 2024

Katherine Kelly Vidal
*Director of the United States Patent and Trademark Office*